US010725215B2

(12) United States Patent
Jung et al.

(10) Patent No.: US 10,725,215 B2
(45) Date of Patent: Jul. 28, 2020

(54) OPTICAL FILTER AND IMAGING DEVICE COMPRISING SAME

(71) Applicant: LMS CO., LTD, Pyeongtaek-si, Gyeonggi-do (KR)

(72) Inventors: Jin Ho Jung, Seoul (KR); Joo Young Kim, Suwon-si (KR); Youn Ha Hwang, Anyang-si (KR)

(73) Assignee: LMS CO., LTD, Pyeongtaek-si, Gyeonggi-Do (KR)

( * ) Notice: Subject to any disclaimer, the term of this patent is extended or adjusted under 35 U.S.C. 154(b) by 308 days.

(21) Appl. No.: 15/558,865

(22) PCT Filed: Mar. 17, 2016

(86) PCT No.: PCT/KR2016/002678
§ 371 (c)(1),
(2) Date: Sep. 15, 2017

(87) PCT Pub. No.: WO2016/148518
PCT Pub. Date: Sep. 22, 2016

(65) Prior Publication Data
US 2018/0074241 A1  Mar. 15, 2018

(30) Foreign Application Priority Data

Mar. 17, 2015 (KR) .................. 10-2015-0036888

(51) Int. Cl.
*G02B 5/08* (2006.01)
*G02B 5/20* (2006.01)
(Continued)

(52) U.S. Cl.
CPC ............. *G02B 5/208* (2013.01); *C08K 11/00* (2013.01); *C09D 1/00* (2013.01); *C09D 5/004* (2013.01);
(Continued)

(58) Field of Classification Search
USPC ........................................................ 359/359
See application file for complete search history.

(56) References Cited

U.S. PATENT DOCUMENTS 5,126,886 A * 6/1992 Richardson ........... F21V 14/006
359/888
2012/0243115 A1* 9/2012 Takamiya .......... B29D 11/0073
359/894
(Continued)

FOREIGN PATENT DOCUMENTS

CN        103874940 A    6/2014
JP        2002-156521 A  5/2002
(Continued)

OTHER PUBLICATIONS

Geng Xia Zhou et al., "Determination of the Characteristics of Photosensitive Resin in Microstereolithography", Science Technology and Engineering, 2011, vol. 11, No. 4.

*Primary Examiner* — Stephone B Allen
*Assistant Examiner* — Jyotsna V Dabbi
(74) *Attorney, Agent, or Firm* — Novick, Kim & Lee, PLLC; Jae Youn Kim

(57) ABSTRACT

An optical filter includes a binder resin matrix, and a light absorbent dispersed in the binder resin matrix. The binder resin matrix in which the light absorbent is dispersed is composed of a single layer, and the binder resin matrix includes n zones (where n is an integer ranging from 3 to 7) equally divided in a thickness direction of the matrix. The binder resin matrix has one or more zones in which 40% or more of the total amount of the light absorbent is dispersed, and has one or more zones in which 10% or less of the total amount of the light absorbent is dispersed.

9 Claims, 14 Drawing Sheets

(51) Int. Cl.
| | |
|---|---|
| *C09D 5/32* | (2006.01) |
| *C09D 7/00* | (2018.01) |
| *G02B 5/22* | (2006.01) |
| *C08K 11/00* | (2006.01) |
| *C09D 1/00* | (2006.01) |
| *C09D 5/33* | (2006.01) |
| *C09D 5/00* | (2006.01) |
| *G02B 1/04* | (2006.01) |
| *G02B 1/11* | (2015.01) |
| *G02B 5/26* | (2006.01) |

(52) U.S. Cl.
CPC ............... *C09D 5/006* (2013.01); *C09D 5/32* (2013.01); *C09D 7/00* (2013.01); *G02B 1/04* (2013.01); *G02B 1/11* (2013.01); *G02B 5/223* (2013.01); *G02B 5/26* (2013.01)

(56) References Cited

U.S. PATENT DOCUMENTS

2013/0094075 A1    4/2013  Saitoh et al.
2013/0331608 A1*  12/2013  Kang ................... C07C 251/30
                                                             564/8
2016/0244593 A1*   8/2016  Um ...................... C08K 5/3492

FOREIGN PATENT DOCUMENTS

| JP | 2011-176176 A | | 9/2011 | |
| JP | 2011176176 A | * | 9/2011 | ............... B23B 7/02 |
| JP | 2012-137646 A | | 7/2012 | |
| JP | 2012137646 A | * | 7/2012 | ............... G02B 5/22 |
| KR | 10-2006-0080405 A | | 7/2006 | |
| KR | 10-2010-0137229 A | | 12/2010 | |
| KR | 10-1453469 B1 | | 10/2014 | |
| WO | WO-2014204163 A1 | * | 12/2014 | |

\* cited by examiner

OPTICAL FILTER AND IMAGING DEVICE COMPRISING SAME

CROSS-REFERENCE TO RELATED APPLICATION

The present application is a national phase entry under 35 U.S.C. § 371 of International Application No. PCT/KR2016/002678 filed Mar. 17, 2016, which claims priority to Korean Patent Application No. 10-2015-0036888, filed on Mar. 17, 2015, the disclosures of which is incorporated by reference.

BACKGROUND

1. Field of the Present Invention

The present invention relates to an optical filter and an imaging device including the same.

2. Discussion of Related Art

In recent years, there is a rising demand for digital camera modules using an image sensor due to the increasing spread of smartphones, tablet computers (PCs), etc. The development strategy of digital camera modules used in such mobile devices is directed toward the pursuit of thinner and high-quality mobile devices.

Image signals of the digital camera modules are received through an image sensor. An image sensor composed of semiconductors has a characteristic of responding even to wavelengths in an infrared (IR) region, unlike human eyes. Therefore, an IR filter configured to block the wavelengths in the IR region is required to obtain information on images similar to those observed by the human eyes.

When such an IR filter has a low pixel count of two million pixels or less, the IR filter generally has a combined structure of an anti-reflective coating layer (AR coating layer) and an infrared reflective coating layer (IR coating layer), both of which are obtained by repeatedly stacking a metal oxide on both sides of a glass material. However, the AR coating layer and the IR coating layer obtained by repeatedly stacking the metal oxide have characteristics such as a big change in spectroscopic properties according to an angle of incidence of light. Meanwhile, the digital camera modules have continued to develop toward an increase in pixels of the image sensor. In such a structure with high pixels, a change in spectroscopic properties according to an angle increases, resulting in degraded quality of images. To minimize such a problem, a structure of a high-pixel digital camera equipped with an IR filter including an infrared absorbent has been used.

A filter configured to have an AR coating layer and an IR coating layer formed on both surfaces thereof, both of which layers are obtained by repeatedly stacking a metal oxide using blue glass as a substrate, has been often used as the absorbent-containing IR filter. In this case, it is practically difficult to manufacture filters having a thickness of 0.2 mm or less due to limitations in processes during manufacturing of a filter with such a thickness when blue glass is used in the filter. Therefore, the IR filter has limitations in being manufactured in a thinner fashion. As an alternative, there is a film-type IR filter having an absorbent formed therein. In the case of conventional film-type optical filters, an AR coating layer and a near-infrared reflective coating layer (NIR coating layer) are formed by depositing a metal oxide and the like on one or both surfaces of a binder resin matrix in which a light absorbent is dispersed. However, in a process of depositing such a metal oxide, an external force is applied to the binder resin matrix, thereby causing warpage of the IR filter. In particular, such a warpage phenomenon caused during the process of depositing a metal oxide acts to cause curls on an optical film. Also, a degree of freedom of design in manufacturing of the optical filter may be degraded due to the structural simplicity of the binder resin matrix in which the light absorbent is dispersed. Further, conventional film-type infrared absorption filters have a structure in which an absorbent is dispersed throughout the film. Such a structure has problems in that it causes haze that reduces image quality of a photographed image, and it is difficult to maintain high transmittance with respect to wavelengths in a visible region required for high-pixel digital cameras.

Patent Document 1: US Patent Publication No. 2013-0094075

SUMMARY OF THE PRESENT INVENTION

The present invention is directed to providing a film-type optical filter capable of effectively cutting off infrared rays (an IR cut off effect), and an imaging device including the same.

One aspect of the present invention provides an optical filter which includes:
a binder resin matrix; and
a light absorbent dispersed in the binder resin matrix,
wherein the binder resin matrix in which the light absorbent is dispersed is composed of a single layer,
the binder resin matrix includes n zones (where n is an integer ranging from 3 to 7) equally divided in a thickness direction of the matrix, and
when it is assumed that the total amount of the light absorbent dispersed throughout the binder resin matrix is set to A,
there are one or more zones in which 40% or more of the light absorbent is dispersed based on the total amount (A) of the light absorbent, and
there are one or more zones in which 10% or less of the light absorbent is dispersed based on the total amount (A) of the light absorbent.

Another aspect of the present invention provides an imaging device including the optical filter according to the present invention.

To achieve the above objectives, still another aspect of the present invention provides a method of manufacturing an optical filter according to the present invention, which includes:
coating one or both surfaces of a binder resin matrix with a solution in which a light absorbent is dispersed; and
thermally treating the binder resin matrix coated with the solution in which the light absorbent is dispersed.

The thermally treating of the binder resin matrix coated with the solution in which the light absorbent is dispersed is performed at a temperature of 130 to 150° C.

BRIEF DESCRIPTION OF THE DRAWINGS

The above and other objects, features and advantages of the present invention will become more apparent to those of ordinary skill in the art by describing in detail exemplary embodiments thereof with reference to the attached drawings, in which.

DETAILED DESCRIPTION OF EXEMPLARY EMBODIMENTS

Figure 1:
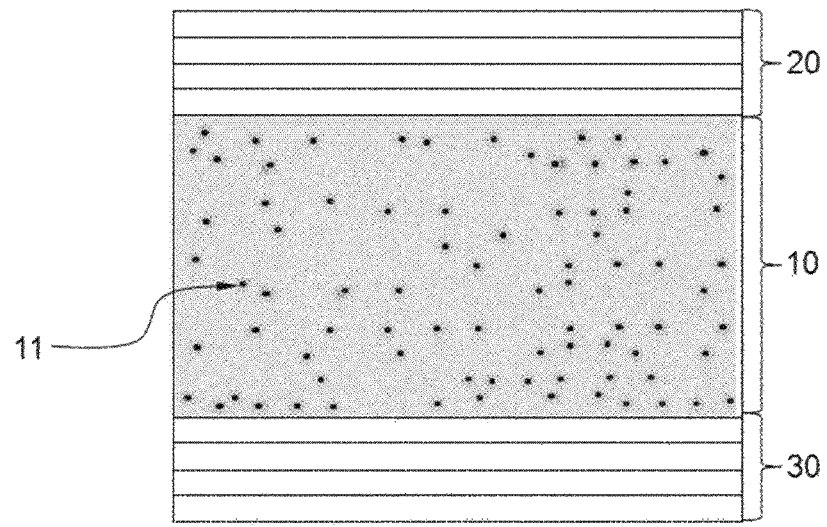
FIG. 1 is a cross-sectional view showing a stacked structure of a conventional optical filter.

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

Although the terms "first," "second," etc. may be used to describe various elements, these elements are not limited by these terms. These terms are only used to distinguish one element from another. For example, a first element could be termed a second element, and, similarly, a second element could be termed a first element, without departing from the scope of exemplary embodiments. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of exemplary embodiments. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components and/or groups thereof, but do not preclude the presence or addition of one or more other features, integers, steps, operations, elements, components and/or groups thereof.

With reference to the appended drawings, exemplary embodiments of the present invention will be described in detail below. To aid in understanding the present invention, like numbers refer to like elements throughout the description of the figures, and the description of the same elements will be not reiterated.

Hereinafter, the present invention will be described in detail.

According to one exemplary embodiment of the present invention, there is provided an optical filter, which includes:

a binder resin matrix; and a light absorbent dispersed in the binder resin matrix, wherein the binder resin matrix in which the light absorbent is dispersed is composed of a single layer, the binder resin matrix includes n zones (where n is an integer ranging from 3 to 7) equally divided in a thickness direction of the matrix, and when it is assumed that the total amount of the light absorbent dispersed throughout the binder resin matrix is set to A, there are one or more zones in which 40% or more of the light absorbent is dispersed based on the total amount (A) of the light absorbent, and there are one or more zones in which 10% or less of the light absorbent is dispersed based on the total amount (A) of the light absorbent.

The optical filter has a structure in which a light absorbent is dispersed in a portion of each of zones divided in a thickness direction of the binder resin matrix. Such a structure is configured to contrast with the conventional structure in which the light absorbent is dispersed through the binder resin matrix.

For the binder resin matrix composed of a single layer, the optical filter according to the present invention also has a structure in which the light absorbent is dispersed in a portion of the binder resin matrix. Therefore, it is possible to fundamentally prevent the occurrence of defects or delamination at the interface between a resin layer and light absorption layer. This is different from the configuration in which a separate light absorption layer is formed on one or both surfaces of the resin layer.

The binder resin matrix according to the present invention may be divided into three or more zones in a thickness direction. The expression "binder resin matrix being divided into zones in a thickness direction" means that the zones may be recognized to be distinguished depending on the concentration of the light absorbent dispersed in the zones, but does not mean that layers are physically distinguishable.

Among the divided zones, at least one zone may be a zone in which the light absorbent is dispersed at a relatively high concentration, and a zone in which the light absorbent is dispersed at a relatively low concentration. In the zone in which the light absorbent is dispersed at a high concentration, when it is assumed that the total amount of the light absorbent dispersed in the binder resin matrix is set to A, an amount of the light absorbent may be greater than or equal to 40% or 70%, or may be in a range of 40 to 99%, 70 to 99%, 40 to 50%, 60 to 95%, or 80 to 99%, based on the total amount (A) of the light absorbent.

Because the binder resin matrix includes both the zone in which the light absorbent is dispersed at a high concentration and the zone in which the light absorbent is dispersed at a low concentration, warpage caused in a manufacturing process may be suppressed. Specifically, in the binder resin matrix, the zone in which the light absorbent is dispersed at a high concentration and the zone in which the light absorbent is dispersed at a low concentration have different stress values. The stress may be regulated by adjusting a concentration of the dispersed light absorbent, and warpage may be effectively prevented by combining zones having different stress values. When the warpage of the binder resin matrix is prevented, a degree of freedom of design in manufacturing of the optical filter may be enhanced. That is, even when an oxide is deposited on one or both surfaces of the binder resin matrix, the oxide may be deposited to have various compositions and thicknesses by adjusting the concentration of the dispersed light absorbent and combining the zones having different stress values.

In this way, curls of the binder resin matrix may also be reduced. In addition, because the light absorbent is locally present in a portion of the binder resin matrix according to the present invention, haze may be reduced through this configuration. Image qualities and resolutions of images photographed with a digital camera may be reduced as the haze of the optical filter increases. In particular, the image qualities and resolutions of the images are greatly influenced by the haze as the pixel size of the image sensor decreases. Therefore, degradation of image qualities and resolutions of images and videos may be prevented by reducing the haze of the optical filter in the high-pixel digital camera.

The optical filter may have a haze value of 0.2% or less, 0.1% or less, or 0.07% or less.

Types of the binder resin used to form the binder resin matrix are not particularly limited. For example, one or more resins selected from the group consisting of a cyclic olefin-based resin, a polyarylate resin, a polysulfone resin, a polyether sulfone resin, a poly(para-phenylene) resin, a polyarylene ether phosphine oxide resin, a polyimide resin, a polyetherimide resin, a polyamide-imide resin, an acrylic resin, a polycarbonate resin, a polyethylene naphthalate resin, and various organic-inorganic hybrid resins may be used as the binder resin.

Also, one or more compounds selected from the group consisting of various types of dyes, pigments or metal complex compounds may be used as the light absorbent, but the present invention is not particularly limited thereto. For example, a cyanine-based compound, a phthalocyanine-based compound, a naphthalocyanine-based compound, or a dithiol metal complex compound may be used as the light absorbent.

The light absorbents may be used alone, and may be used in combination of two or more types thereof, when necessary.

According to one exemplary embodiment of the present invention, the binder resin matrix includes a first zone, a $k^{th}$ zone (where k is an integer ranging from 2 to n-1), and an $n^{th}$ zone (where n is an integer ranging from 3 to 7) when one surface of the matrix is divided into zones in a thickness direction, and at least one of the first zone and the $n^{th}$ zone may be a zone in which 40% or more of the light absorbent is dispersed based on the total amount of the light absorbent.

According to another exemplary embodiment, the binder resin matrix includes a first zone, a $k^{th}$ zone (where k is an integer ranging from 2 to n-1), and an $n^{th}$ zone (where n is an integer ranging from 3 to 7) when one surface of the matrix is divided into zones in a thickness direction, and the first zone or the $n^{th}$ zone may be a zone in which 70% or more, 80% or more, 90% or more, or 70 to 99% of the light absorbent is dispersed based on the total amount of the light absorbent.

According to still another exemplary embodiment, the binder resin matrix includes a first zone, a $k^{th}$ zone (where k is an integer ranging from 2 to n-1), and an $n^{th}$ zone (where n is an integer ranging from 3 to 7) when one surface of the matrix is divided into zones in a thickness direction, at least one of the first zone and the $n^{th}$ zone may be a zone in which 10% or less of the light absorbent is dispersed based on the total amount of the light absorbent, and the $k^{th}$ zone may be a zone in which 40% or more of the light absorbent is dispersed based on the total amount of the light absorbent. Here, when the dispersed light absorbent is present at a relatively high concentration in an inner zone of the binder resin matrix, an optical filter may be prepared, for example, by coating a surface of the binder resin matrix with a solution including the light absorbent, thermally treating the binder resin matrix to remove the solvent, and again coating the surface of the binder resin matrix with a solution including no light absorbent.

According to yet another exemplary embodiment, the binder resin matrix includes five zones into which one surface of the matrix is divided in a thickness direction, and at least one of the first zone and the fifth zone may be a zone in which 10% or less, 5% or less, 1% or less, or 10 to 0.001% of the light absorbent is dispersed based on the total amount of the light absorbent. Also, at least one of the first zone and the fifth zone may be a zone in which 40% or more of the light absorbent is dispersed based on the total amount of the light absorbent.

The binder resin matrix according to the present invention has a significantly lowered degree of warpage. According to one exemplary embodiment, the binder resin matrix in which the light absorbent is dispersed satisfies the following Expression 1.

$$F_{max} \leq 40 \ (\mu m) \qquad \text{[Expression 1]}$$

wherein $F_{max}$ refers to a warpage value of a specimen, and $F_{max}$, for a specimen having a size of 10 mm×10 mm (width×length), represents the maximum separation distance from a straight line connecting both ends of a specimen in a ±2.3 mm section in a horizontal direction (X axis) with respect to the center of the specimen.

The $F_{max}$ value disclosed in Expression 1 may be less than or equal to 40 μm, 35 μm, or 15 μm, or in a range of 0.5 to 40 μm, 10 to 40 μm, or 1 to 15 μm. In the present invention, it can be seen that a degree of occurrence of warpage may be remarkably lowered by dispersing a varying concentration of the light absorbent in the binder resin matrix in a thickness direction. In the binder resin matrix according to the present invention, the occurrence of warpage may be suppressed to the maximum extent. When necessary, the warpage may be induced in one direction. When the occurrence of warpage of the binder resin matrix is suppressed, a film may have high flatness, and it is desirable to manufacture an optical filter whose surface is close to being horizontal. Also, when the occurrence of warpage of the binder resin matrix is induced, the degrees of warpage caused during deposition of an additionally stacked metal oxide may be summed up to manufacture an optical filter in a desired shape. In this way, a degree of freedom of design for the optical filter may be enhanced.

The optical filter according to one exemplary embodiment of the present invention may include a near-infrared reflective coating layer (an NIR coating layer) formed on one or both surfaces of the binder resin matrix in which the light absorbent is dispersed. Specifically, the optical filter according to one exemplary embodiment of the present invention may include both an NIR coating layer formed on a first surface of the binder resin matrix in which the light absorbent is dispersed, and an anti-reflective coating layer (AR coating layer) formed on a second surface of the binder resin matrix in which the light absorbent is dispersed.

The NIR coating layer may be formed as a multilayer dielectric film. The NIR coating layer serves to reflect light of a near-infrared region. For example, a multilayer dielectric film in which a high refractive index layer and a low refractive index layer are alternately stacked may be used as the NIR coating layer. When necessary, the NIR coating layer may further include an aluminum-deposited film, a noble metal thin film, or a resin film in which fine particles of either indium oxide or tin oxide are dispersed.

By way of an example, the NIR coating layer may have a structure in which a dielectric layer having a first refractive index and a dielectric layer having a second refractive index are alternately stacked. A difference in refractive index between the dielectric layer having a first refractive index and the dielectric layer having a second refractive index may be greater than or equal to 0.2, or 0.3, or in a range of 0.2 to 1.0.

For example, the dielectric layer having a first refractive index may be a layer having a relatively high refractive index, and the dielectric layer having a second refractive index may be a layer having a relatively low refractive index. In this case, the refractive index of the dielectric layer having a first refractive index may be in a range of 1.6 to 2.4, and the refractive index of the dielectric layer having a second refractive index may be in a range of 1.3 to 1.6.

The dielectric layer having a first refractive index may be formed of at least one selected from the group consisting of titanium oxide, alumina, zirconium oxide, tantalum pentoxide, niobium pentoxide, lanthanum oxide, yttrium oxide, zinc oxide, zinc sulfide, and indium oxide. The indium oxide may further include a small amount of titanium oxide, tin oxide, or cerium oxide, when necessary.

The dielectric layer having a second refractive index may be formed of at least one selected from the group consisting of silica, lanthanum fluoride, magnesium fluoride, and sodium fluoride alumina.

A method of forming the NIR coating layer is not particularly limited, and the NIR coating layer may, for example, be formed using a method such as CVD, sputtering, vacuum deposition, etc.

The NIR coating layer may have a structure in which the dielectric layer having a first refractive index and the dielectric layer having a second refractive index are alternately stacked 5 to 61 times, 11 to 51 times, or 21 to 41 times. The NIR coating layer may be designed in consideration of a desired range of transmittance and refractive index, a region of wavelengths to be blocked, etc.

The NIR coating layer may further include a light absorbent dispersed in the multilayer dielectric film. For example, the light absorbent dispersed in the multilayer dielectric film may be used without any particular limitation as long as the light absorbent can absorb light in a near-infrared (500 nm or more) to infrared wavelength region. The light absorbent may be dispersed in the multilayer dielectric film to reduce the number of alternately stacked layers in the multilayer dielectric film, thereby reducing a thickness of the NIR coating layer. In this way, when the NIR coating layer is applied to imaging devices, the imaging devices may be made smaller.

According to one exemplary embodiment, when a larger amount of the light absorbent is included in the multilayer dielectric film, the multilayer dielectric film having a smaller thickness may be manufactured. In this way, the imaging devices may be made smaller.

The AR coating layer serves to reduce a phenomenon in which light incident on the optical filter is reflected at the interface. In this way, a quantity of light incident on the optical filter increases. The AR coating layer is formed to reduce surface reflectivity to enhance reflection efficiency and remove interference and scattering caused by reflected light. For example, the AR coating layer may be formed by forming a film on a surface of a dielectric material having a lower refractive index than glass using methods such as vacuum deposition, etc. In the case of the AR coating layer, films may be formed using various commercially available materials without particular limitation.

The present invention provides an imaging device including the aforementioned optical filter. The imaging device includes a camera device installed in a mobile device such as a mobile phone, a camera device installed in a digital camera and a laptop computer, a camera device for CCTV, etc., but the present invention is not particularly limited thereto.

The present invention provides a method of manufacturing the aforementioned optical filter. According to one exemplary embodiment of the present invention, the method of manufacturing an optical filter may include coating one or both surfaces of a light-transmitting film with a solution in which a light absorbent is dispersed, and thermally treating the coated binder resin matrix. Specifically, various processes for the method, such as slot-die coating, microgravure coating, spin coating, and solution casting, may be used as the process of applying the light absorbent. Then, the thermally treating of the binder resin matrix may be performed at a temperature of 130 to 150° C.

Using this process, the light absorbent may penetrate into the binder resin matrix so that the light absorbent can be partially dispersed in the binder resin matrix.

Also, the method of manufacturing an optical filter may also include a method of partially injecting a solution including the light absorbent into the binder resin matrix.

Hereinafter, the present invention will be described in further detail with reference to the accompanying drawings. However, it should be understood that that the description of the drawings disclosed herein is for the purpose of illustration only and is not intended to limit or define the scope of the present invention.

FIG. 1 is a cross-sectional view showing a stacked structure of a conventional optical filter according to the present invention. Referring to FIG. 1, the conventional optical filter includes a light absorbent 11 dispersed throughout a binder resin matrix 10. Also, the conventional optical filter is configured so that an AR coating layer 20 is formed on one surface of the binder resin matrix 10, and an NIR coating layer 30 is formed on the opposite surface of the binder resin matrix 10. Because the optical filter shown in FIG. 1 has a structure in which the light absorbent 11 is dispersed throughout the binder resin matrix 10, an increase in amount of the light absorbent 11 used herein may be inevitably caused. The light absorbent 11 dispersed in the binder resin matrix 10 may serve as impurities in terms of light transmittance and thus haze is caused. Also, because the optical filter shown in FIG. 1 has a relatively simple stacked structure, warpage may be induced due to the stress caused during formation of the AR coating layer 20 and the NIR coating layer 30.

Figure 2:
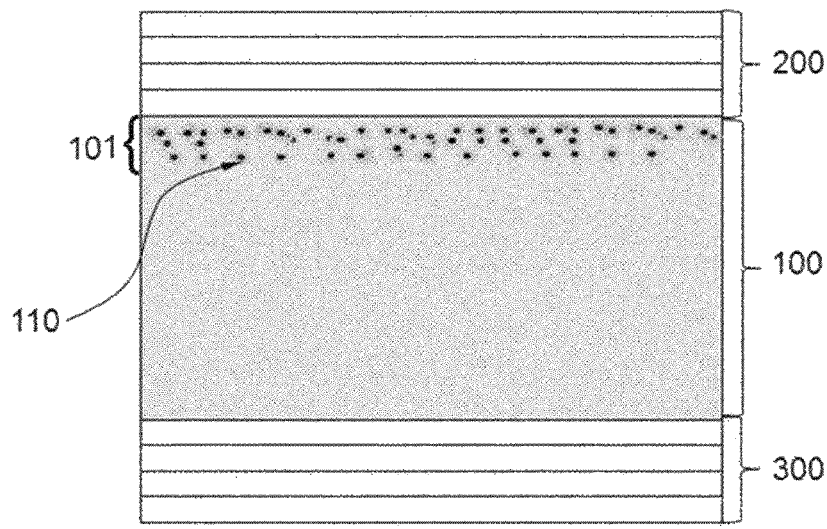
FIGS. 2 to 4 are cross-sectional views showing stacked structures of optical filters according to one exemplary embodiment of the present invention, respectively.
Figure 3:
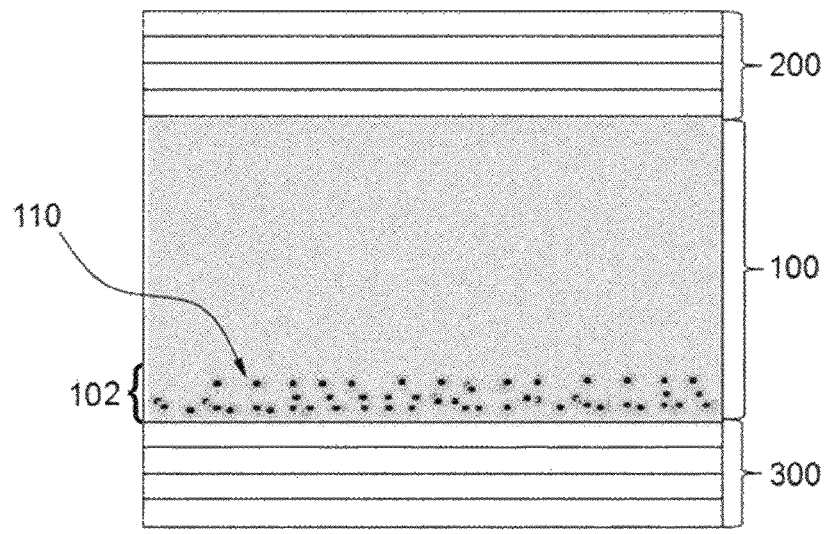
Figure 4:
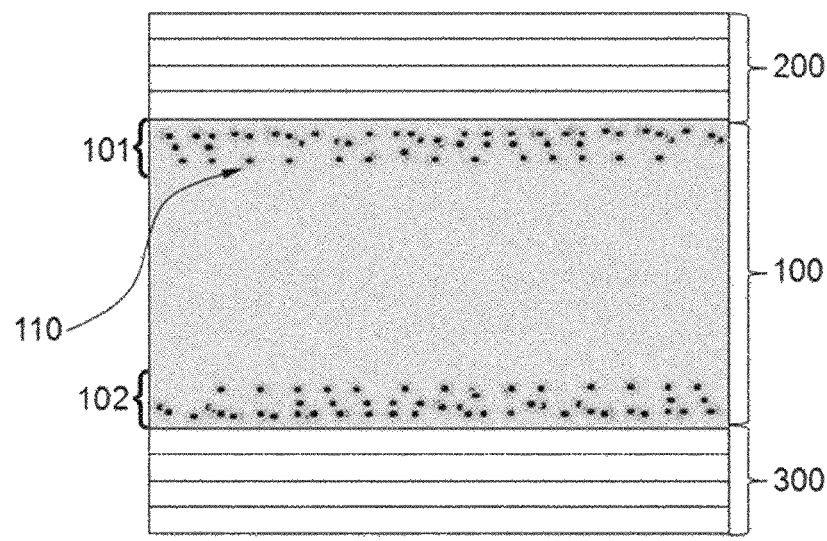
Figure 5:
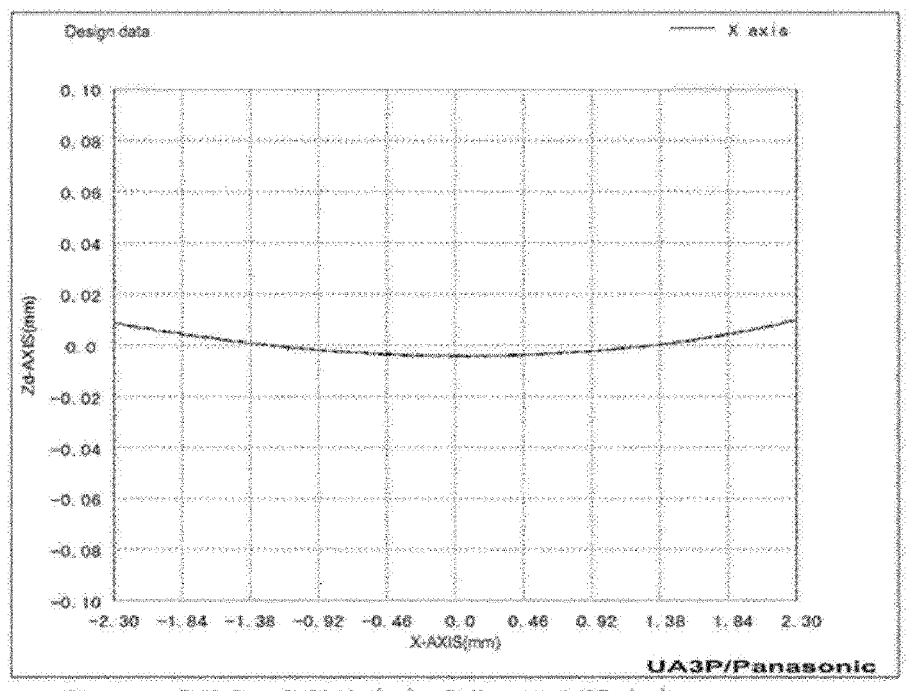
FIGS. 5 to 14 are graphs illustrating results of measuring degrees of warpage of polymer resin matrices according to one exemplary embodiment of the present invention, respectively.
Figure 6:
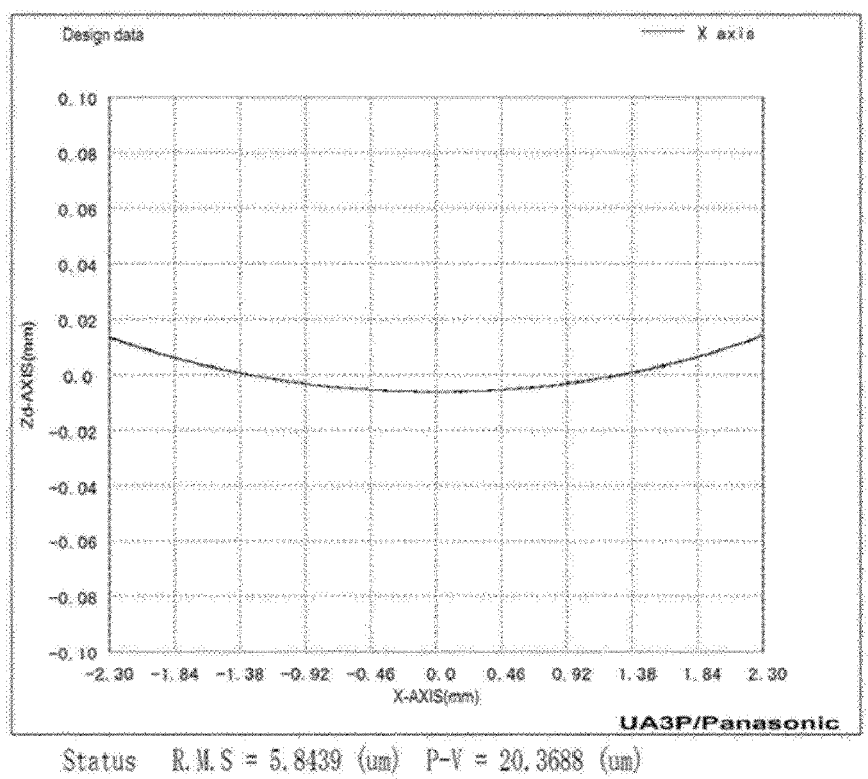
Figure 7:
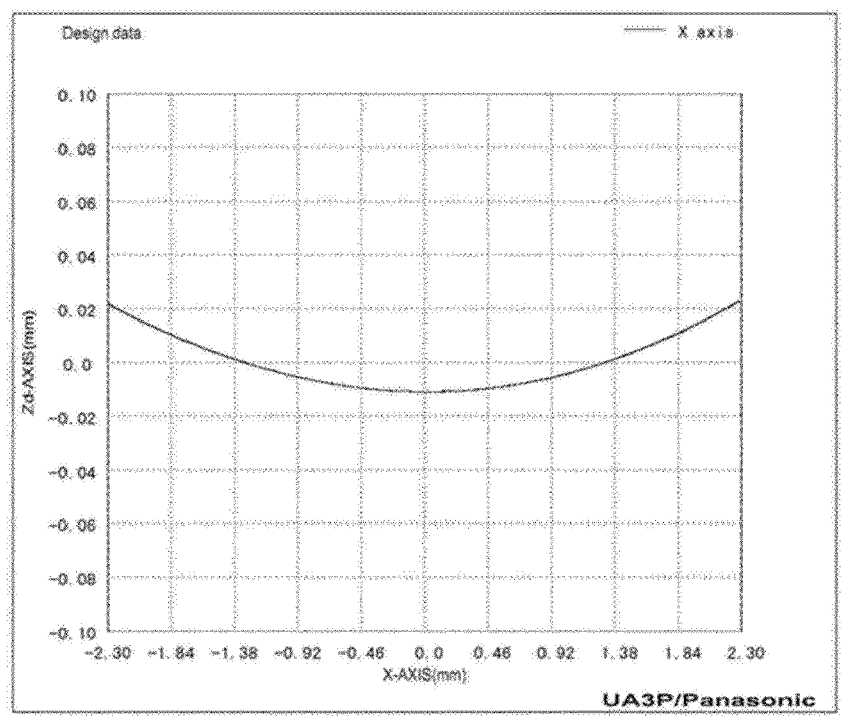
Figure 8:
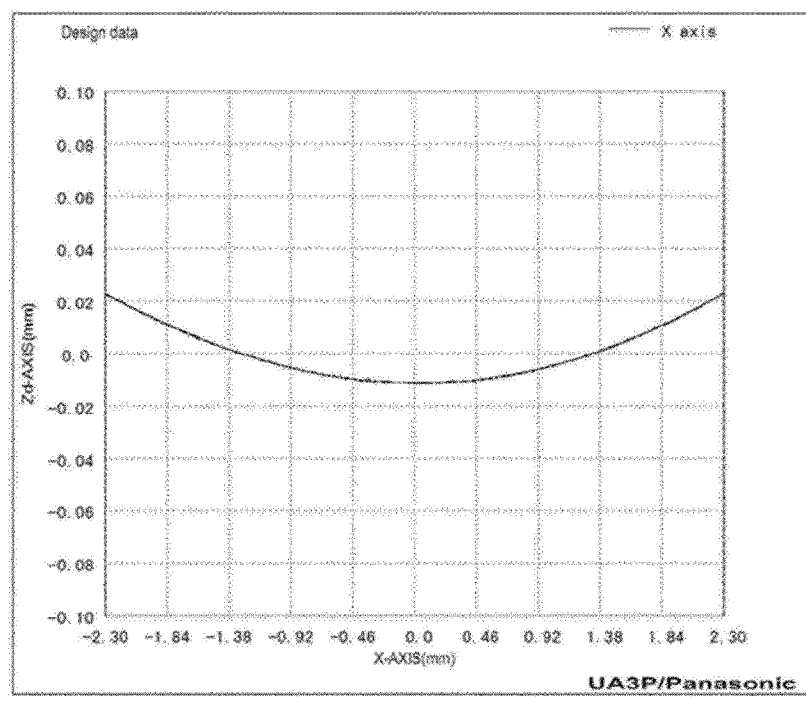
Figure 9:
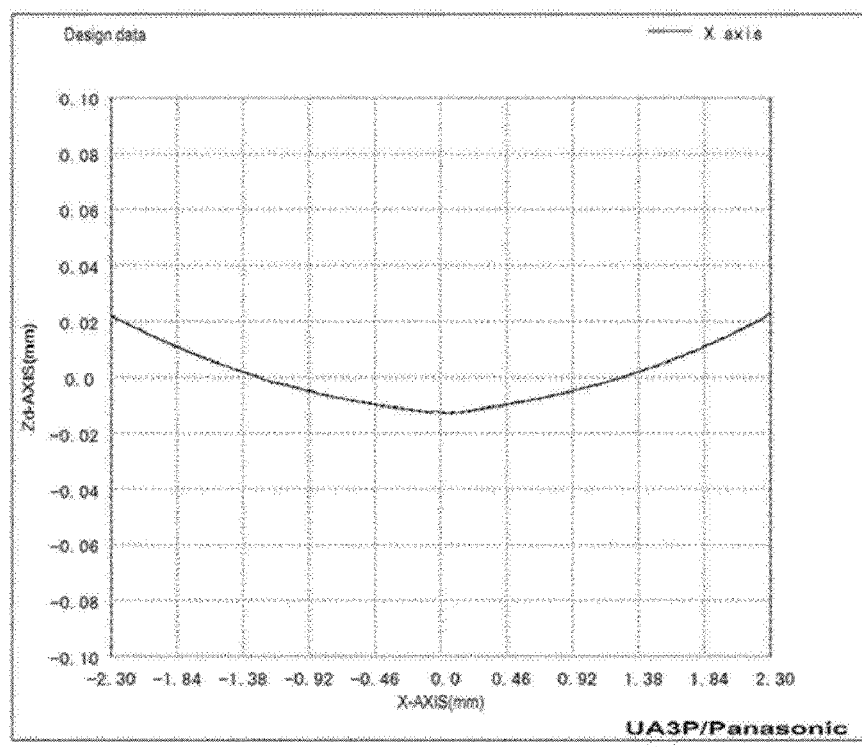
Figure 10:
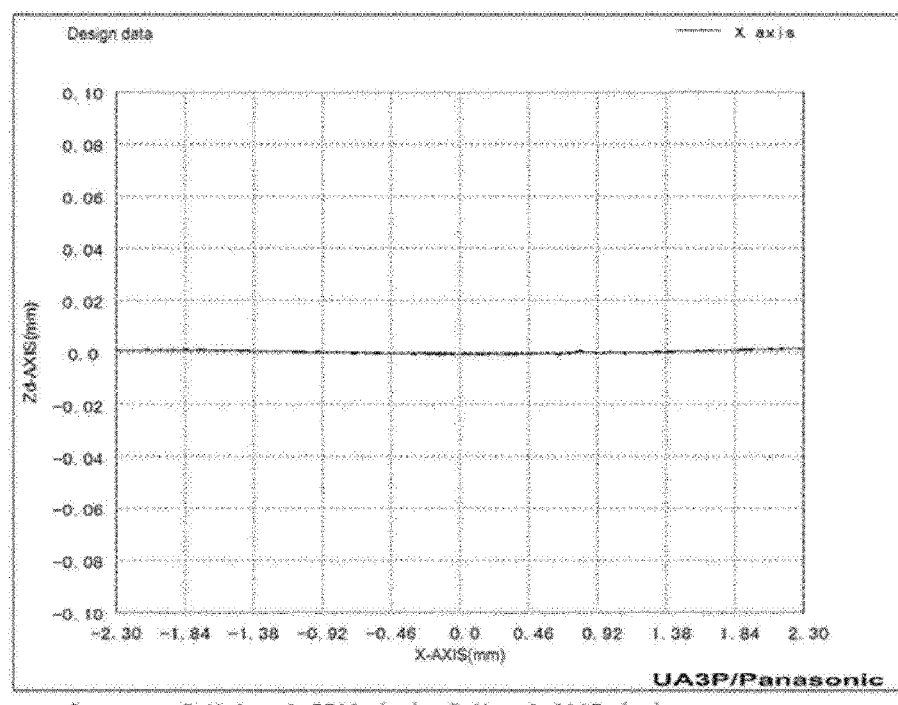
Figure 11:
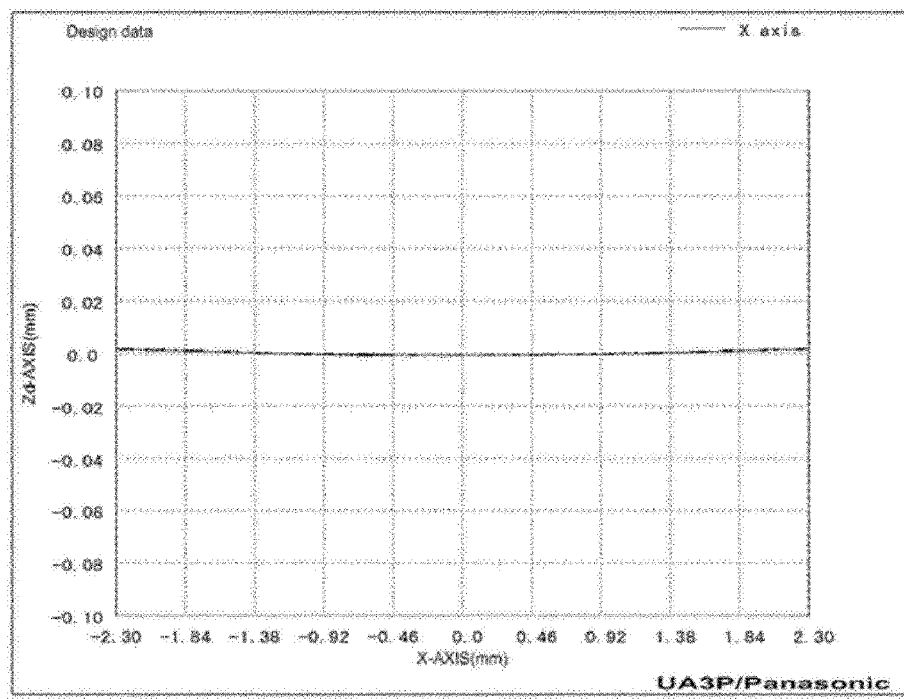
Figure 12:
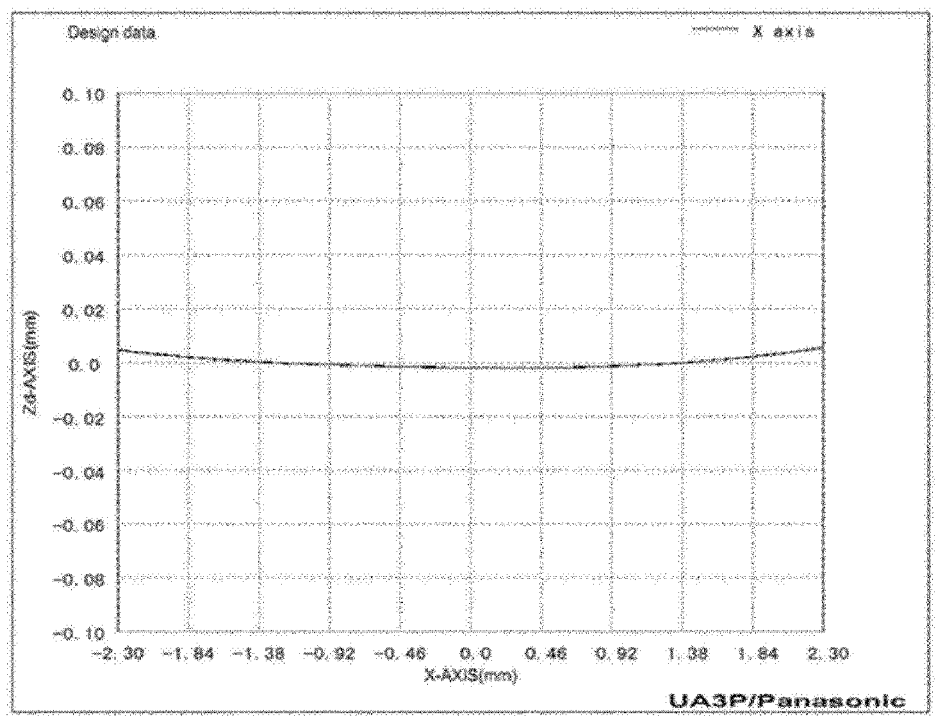
Figure 13:
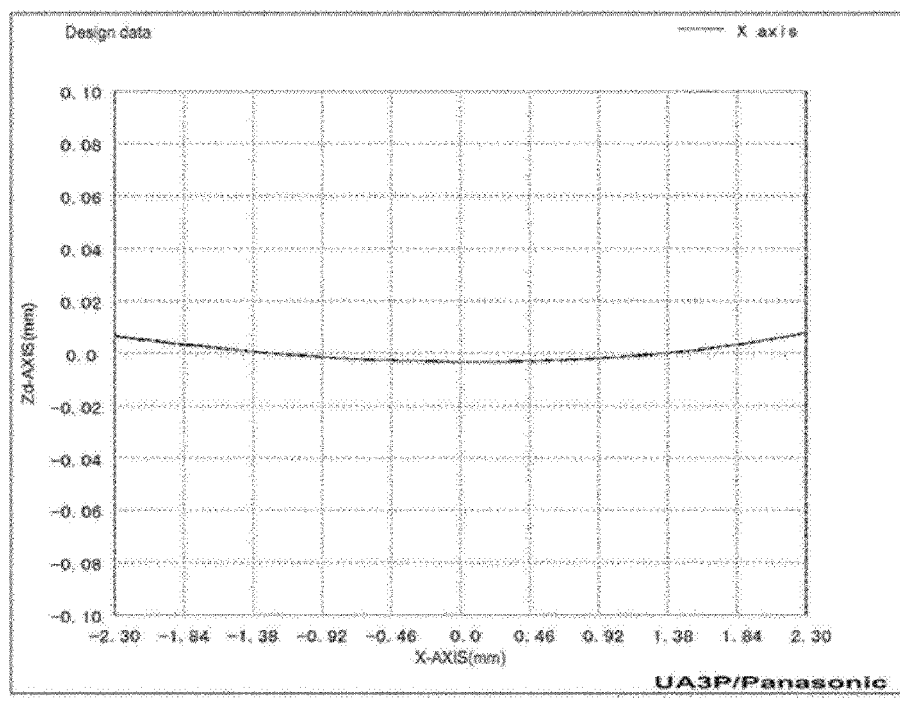
Figure 14:
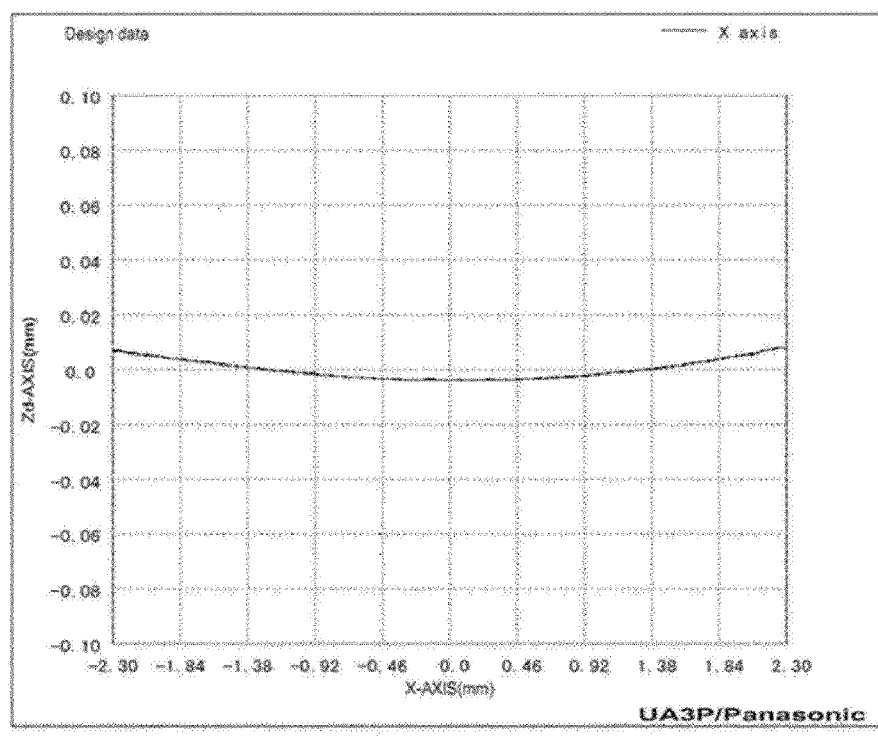

On the other hand, FIGS. 2 to 4 are cross-sectional views showing stacked structures of optical filters according to one exemplary embodiment of the present invention, respectively.

Referring to FIG. 2, it can be seen that a high concentration of a light absorbent 110 is dispersed in a first zone 101 disposed at an upper inner portion of a binder resin matrix 100. An AR coating layer 200 is formed on one surface of the binder resin matrix 100, and an NIR coating layer 300 is formed on the opposite surface of the binder resin matrix 100. For example, the optical filter shown in FIG. 2 has a structure in which the light absorbent 110 is intensively dispersed in the first zone 101 of the binder resin matrix 100. As a result, it is possible to reduce an amount of the light absorbent 110 used and manufacture thin optical filters, resulting in reduced haze. In particular, a degree of dispersion of the light absorbent 110 may be controlled to induce occurrence of stress with respect to the binder resin matrix 100 in one direction. In this case, the optical filter may be designed so that stress caused due to intensive dispersion of the light absorbent 110 and stress caused during stacking of an AR coating layer 200 and an NIR coating layer 300 to be stacked below act in opposite directions. In this way, it is possible to manufacture a film-type optical filter whose warpage is significantly reduced.

Referring to FIG. 3, it can be seen that a high concentration of the light absorbent 110 is dispersed in a second zone 102 disposed at a lower inner portion of a binder resin matrix 100. Referring to FIG. 4, it can also be seen that a high concentration of the light absorbent 110 is dispersed in both of the first zone 101 and second zone 102 of the binder resin matrix 100.

In FIGS. 2 to 4, at least one of the AR coating layer 200 and the NIR coating layer 300 may be omitted, when necessary. Also, a structure in which the AR coating layer 200 and the NIR coating layer 300 are sequentially stacked on the same plane with respect to the binder resin matrix 100 is not excluded.

Hereinafter, the optical filter having a novel structure according to the present invention will be described in detail with reference to specific embodiments of the present invention. However, it should be understood that that the following examples are just preferred examples for the purpose of illustration only and are not intended to limit or define the scope of the present invention.

EXAMPLES 1 TO 5

A light absorbent, which was commercially available and has a maximum absorption of 690 nm was mixed with toluene (commercially available from Sigma Aldrich), and the resulting mixture was stirred for 24 hours or more to prepare a solution for near-infrared absorption.

One surface of a binder resin matrix was coated with the solution for near-infrared absorption, and the toluene was then evaporated. In this case, a depth of penetration of a light absorbent into the binder resin matrix was adjusted by controlling a concentration of the solution for near-infrared absorption. The concentration of the solutions for near-infrared absorption prepared in Examples 1 to 5 were adjusted so that average depths of penetration of the light absorbent into the binder resin matrix were adjusted to be 8 μm, 17 μm, 26 μm, 35 μm, and 44 μm, respectively.

$TiO_2$ and $SiO_2$ were alternately deposited on one surface of the binder resin matrix, into which the light absorbent penetrated, using an E-beam evaporator to form an NIR coating layer having a thickness of 5.5 μm. Thereafter, $TiO_2$ and $SiO_2$ were alternately deposited on a surface of the binder resin matrix opposite to the surface on which the NIR coating layer was formed to form an AR coating layer having a thickness of 3.2 μm.

The manufactured optical filter was measured to have a total thickness of 108.7 μm.

EXAMPLES 6 TO 10

Optical filters were manufactured in the same manner as in Example 1, except that both surfaces of the binder resin matrix were coated with the prepared solution for near-infrared absorption, and the solvent was then evaporated.

The concentration of the solutions for near-infrared absorptions prepared in Examples 6 to 10 were adjusted so that average depths of penetration of the light absorbent into the binder resin matrix were adjusted to be 8 μm, 17 μm, 26 μm, 35 μm, and 44 μm, respectively.

COMPARATIVE EXAMPLE 1

To prepare a binder resin matrix, a light absorbent, which was commercially available and has a maximum absorption of 690 nm was mixed with toluene (commercially available from Sigma Aldrich), and the resulting mixture was stirred for 24 hours or more. Thereafter, the stirred solution was solution-cast, and then cured so that the light absorbent was uniformly distributed in a binder resin matrix.

$TiO_2$ and $SiO_2$ were alternately deposited on one surface of the binder resin matrix, with which the light absorbent was mixed, using an E-beam evaporator to form an NIR coating layer having a thickness of 5.5 μm. Thereafter, $TiO_2$ and $SiO_2$ were alternately deposited on a surface of the binder resin matrix opposite to the surface on which the NIR coating layer was formed to form an AR coating layer having a thickness of 3.2 μm.

It was revealed that the manufactured optical filter had a total thickness similar to that of Example 1.

EXAMPLE 11

A light absorbent, which was commercially available and has a maximum absorption of 690 nm was mixed with toluene (commercially available from Sigma Aldrich), and the resulting mixture was stirred for 24 hours or more to prepare a solution for near-infrared absorption.

One surface of a binder resin matrix was coated with the prepared solution for near-infrared absorption, and the solvent was then evaporated through thermal treatment.

Next, a surface of the binder resin matrix from which the solvent was completely evaporated was coated with a toluene solution including no light absorbent to prepare an optical filter so that the light absorbent was disposed in a portion of an inner zone of the binder resin matrix.

A depth of penetration of the light absorbent into the binder resin matrix was controlled to an average depth of 26 μm, and a zone in which the light absorbent was not dispersed up to 8 μm from a surface of the binder resin matrix was formed.

$TiO_2$ and $SiO_2$ were alternately deposited on one surface of the binder resin matrix, into which the light absorbent penetrated, using an E-beam evaporator to form an NIR coating layer having a thickness of 5.5 μm. Thereafter, $TiO_2$ and $SiO_2$ were alternately deposited on a surface of the binder resin matrix opposite to the surface on which the NIR coating layer was formed to form an AR coating layer having a thickness of 3.2 μm.

The manufactured optical filter was measured to have a total thickness of 108.7 μm.

EXPERIMENTAL EXAMPLE 1

A degree of warpage of each of the light absorbents prepared in Examples 1 to 10 in which a light absorbent was dispersed was measured. UA3P commercially available from Panasonic Corp. was used to perform the measurements to calculate a degree of warpage.

Specifically, a specimen used to measure a degree of warpage was cut into pieces having a size of 10 mm×10 mm (width×length). Thereafter, a degree of warpage of a ±2.3 mm section in a horizontal direction (X axis) with respect to the center of the specimen was calculated. The degree of warpage was measured as a separation distance from a straight line connecting both ends of the specimen. Here, both ends of the specimen represent points at ±2.3 mm. The degrees of warpage were calculated at the respective points. Among these, the maximum value was selected as a warpage value.

The results of measuring the degrees of warpage of the optical filters manufactured in Examples 1 to 5 are shown in FIGS. 5 to 9, respectively. The results of measuring the degrees of warpage of the optical filters manufactured in Examples 6 to 10 are shown in FIGS. 10 to 14, respectively. Also, the results of measuring the degrees of warpage calculated in the respective experiments are listed in the following Table 1.

TABLE 1

| No. of Examples | Depth of penetration of light absorbent (μm) | Degree of warpage (μm) |
| --- | --- | --- |
| Example 1 | 8 | 14.0 |
| Example 2 | 17 | 20.4 |
| Example 3 | 26 | 33.9 |
| Example 4 | 35 | 34.5 |
| Example 5 | 44 | 35.8 |
| Example 6 | 16 | 2.2 |
| Example 7 | 34 | 3.2 |
| Example 8 | 52 | 7.5 |
| Example 9 | 70 | 11.3 |
| Example 10 | 88 | 12.2 |
| Example 11 | 26 | 28.1 |

Referring to Table 1, it was revealed that the degrees of warpage of the polymer resin matrices prepared in Examples 1 to 5 were in a range of 14.0 to 35.8 μm. It was confirmed that a higher degree of warpage was induced as the depth of penetration of the light absorbent became higher. However, it was confirmed that the degree of warpage of the polymer resin matrix did not exceed 36 μm in the case of Example 5 in which the light absorbent depth of penetration was 44 μm.

Also, it was revealed that the degrees of warpage of the polymer resin matrices were in a range of 2.2 to 12.2 μm in the case of Examples 6 to 10 in which the light absorbent penetrated into both sides of each of the polymer resin matrices. In this regard, it can be seen that the warpage of the polymer resin matrices was remarkably reduced, compared to those of Examples 1 to 5. From these facts, it was judged that the occurrence of warpage may be further minimized by forming layers, into which the light absorbent penetrated, on both surface of each of the polymer resin matrices.

EXPERIMENTAL EXAMPLE 2

Light transmission spectra for the optical filters manufactured in Examples 1 to 6 were measured, and compared with that of the optical filter of Comparative Example 1.

Figure 15:
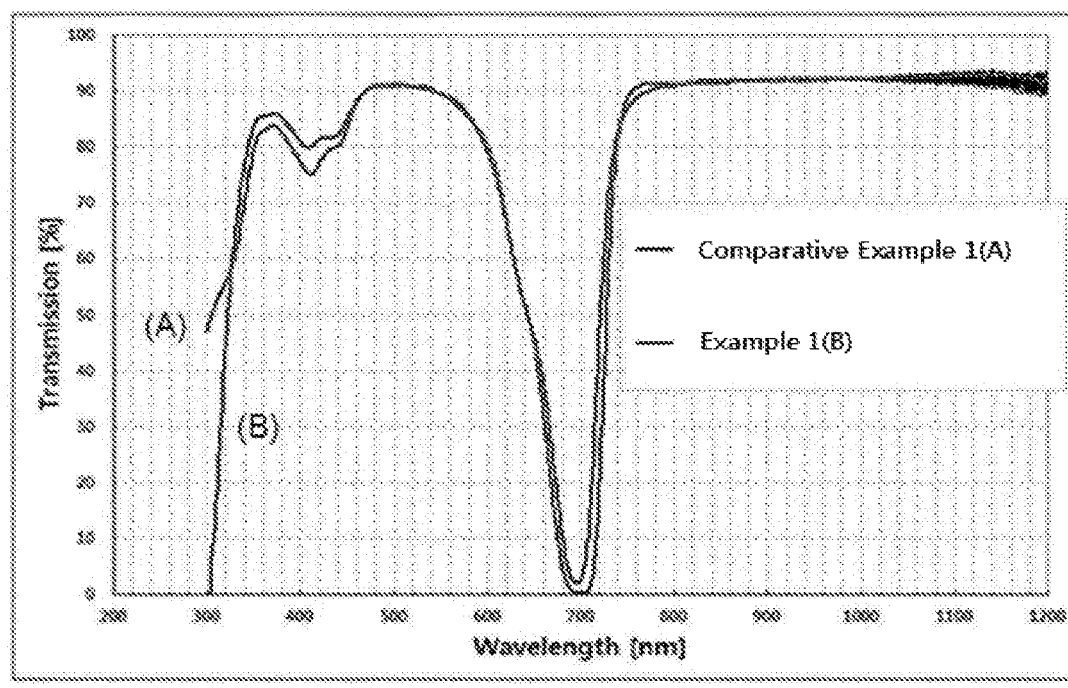
FIGS. 15 and 16 are graphs illustrating results of measuring light transmittance spectra of optical filters according to one exemplary embodiment of the present invention, respectively, to compare the light transmittance spectra of the optical filters.
Figure 16:
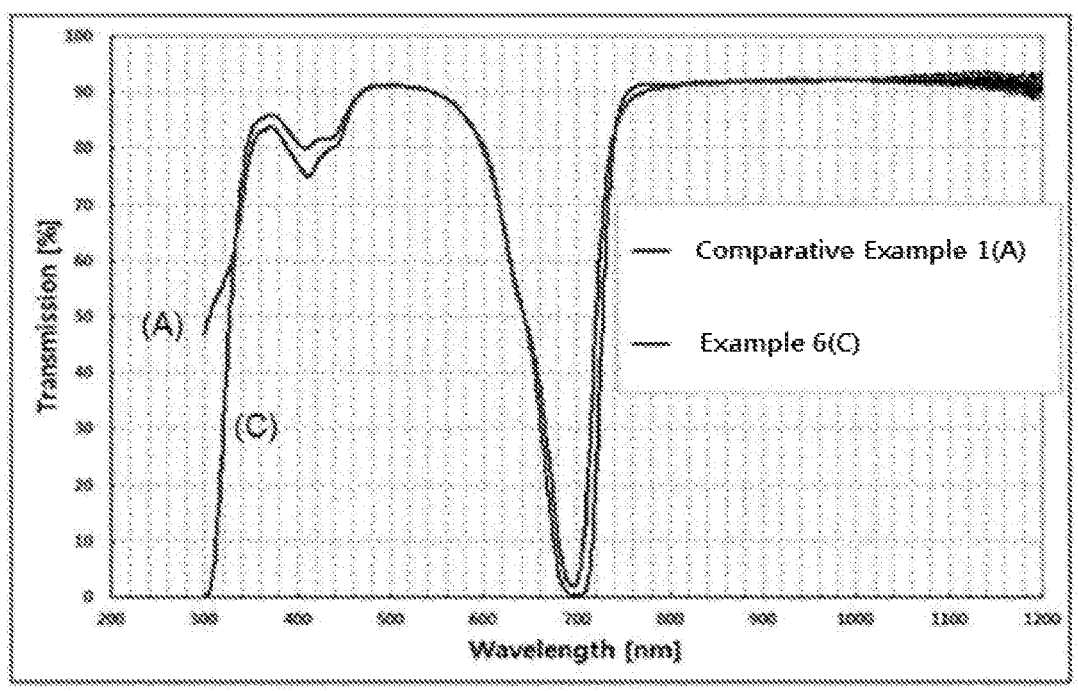

Specifically, FIG. 15 shows results of measuring light transmittance spectra of the optical filters of Example 1 (B) and Comparative Example 1 (A) to compare the light transmittance spectra of the optical filters. Also, FIG. 16 shows results of measuring light transmittance spectra of the optical filters of Example 6 (C) and Comparative Example 1 (A) to compare the light transmittance spectra of the optical filters.

The measurement results are summarized in the following Table 2.

TABLE 2

| Items | Example 1 | Example 6 | Comparative Example 1 |
| --- | --- | --- | --- |
| Average transmittance | 87.74% | 87.87% | 87.05% |
| Minimum transmittance | 79.86% | 79.96% | 74.98% |
| T50% | 643.2 nm | 643.8 nm | 643.7 nm |

In Table 2, the average transmittance is a value obtained by calculating an average value of light transmittance in a wavelength region of 410 to 565 nm, and the minimum transmittance is a value obtained by calculating the minimum value of the light transmittance in a wavelength region of 410 to 565 nm. Also, T50% represents the first wavelength value at which the light transmittance reaches 50% in a wavelength region of 600 nm or more.

Referring to Table 2, it was revealed that the optical filters manufactured in Examples 1 and 6 had an average light transmittance of 87.5% or more and the minimum transmittance of 79% or more in a wavelength region of 410 to 565 nm.

In this regard, it can be seen that the average light transmittances of the optical filters of Examples 1 and 6 were improved by 0.69% and 0.82%, and the minimum transmittances were improved by 4.88% and 4.98%, respectively, compared to that of the optical filter of Comparative Example 1.

From these facts, it can be seen that the average light transmittances and minimum transmittances of the optical filters (Examples 1 and 6) according to the present invention were improved by 0.6% or more and 4.8% or more, respectively, compared to that of the conventional optical filter (Comparative Example 1).

EXPERIMENTAL EXAMPLE 3

Haze of each of the optical filters manufactured in Example 1 and Comparative Example 1 was measured. The haze measurement was performed using NDH 2000N commercially available from Nippon Denshoku Industries Co., Ltd.

The haze measurement was performed on each of the specimens at any three given points. The measurement results are listed in the following Table 3.

TABLE 3

| Items | Example 1 | Comparative Example 1 |
| --- | --- | --- |
| Point 1 | 0.07% | 0.30% |
| Point 2 | 0.06% | 0.30% |
| Point 3 | 0.05% | 0.33% |
| Average | 0.06% | 0.31% |

Referring to Table 3, it was revealed that the optical filter manufactured in Example 1 had an average haze value of 0.06%, but the optical filter manufactured in Comparative Example 1 had an average haze value of 0.31%. From these facts, it can be seen that the haze of the optical filter according to the present invention was significantly reduced to approximately 20% of that of the conventional optical filter.

The haze value measured in Experimental Example 3 is preferably less than or equal to 0.2%, and more preferably less than or equal to 0.1%.

What is claimed is:

1. An optical filter comprising:
   a binder resin matrix including a single layer having a uniform thickness along a surface thereof, and a light absorbent dispersed therein;
   an anti-reflective coating layer directly adjacent to the surface of the binder resin matrix, the anti-reflective coating layer including a plurality of metal oxide layers; and
   a near-infrared reflective coating layer directly adjacent to an opposite surface of the binder resin matrix, the near-infrared reflective coating layer including a plurality of metal oxide layers,
   wherein the binder resin matrix comprises n zones equally divided in a thickness direction of the binder resin matrix,
   wherein n is an integer ranging from 3 to 7,
   wherein the n zones include one or more zones in which 40 to 100% of the total amount of the light absorbent is dispersed, and
   wherein the n zones include one or more zones in which 0 to 10% of the total amount of the light absorbent is dispersed.

2. The optical filter of claim 1, wherein the n zones include a first zone, a $k^{th}$ zone, and an $n^{th}$ zone when the binder resin matrix is divided into the n zones in the thickness direction,
   wherein k is an integer ranging from 2 to n−1, and
   wherein at least one of the first zone and the $n^{th}$ zone is the one or more zones in which 40 to 100% of the total amount of the light absorbent is dispersed.

3. The optical filter of claim 1, wherein the n zones include a first zone, a $k^{th}$ zone and an $n^{th}$ zone when the binder resin matrix is divided into the n zones in the thickness direction,
   wherein k is an integer ranging from 2 to n−1, and
   wherein the first zone or the $n^{th}$ zone is a zone in which 70 to 100% of the total amount of the light absorbent is dispersed.

4. The optical filter of claim 1, wherein the n zones include a first zone, a $k^{th}$ zone, and an $n^{th}$ zone when the binder resin matrix is divided into the n zones in the thickness direction,
   wherein k is an integer ranging from 2 to n−1, and
   wherein at least one of the first zone and the $n^{th}$ zone is a zone the one or more zones in which 0 to 10% of the total amount of the light absorbent is dispersed, and
   the $k^{th}$ zone is one of the one or more zones in which 40 to 100% of the total amount of the light absorbent is dispersed.

5. The optical filter of claim 1, wherein the n zones include five zones into which the binder resin matrix is divided in the thickness direction, and
   at least one of the first zone and the fifth zone is the one or more zones in which 0 to 10% of the total amount of the light absorbent is dispersed.

6. The optical filter of claim 1, wherein the binder resin matrix in which the light absorbent is dispersed satisfies the following Expression 1:

$$F_{max} \leq 40 \text{ (μm)} \quad \text{[Expression 1]}$$

wherein $F_{max}$, refers to a warpage value of a specimen, and
   $F_{max}$, for a specimen having a size of 10 mm×10 mm (width×length), represents a maximum separation distance from a straight line connecting both ends of the specimen in a ±2.3 mm section in a horizontal direction (X axis) with respect to the center of the specimen.

7. The optical filter of claim 1, wherein the binder resin matrix has a haze value of 0 to 0.2%.

8. The optical filter of claim 7, wherein the binder resin matrix has the haze value of 0 to 0.07%.

9. An imaging device comprising the optical filter defined in claim 1.

* * * * *